United States Patent
Han et al.

(10) Patent No.: US 12,202,522 B2
(45) Date of Patent: Jan. 21, 2025

(54) BATTERY POWER CONTROL IN AUTONOMOUS VEHICLES HAVING ALTERNATOR-CHARGING SYSTEMS

(71) Applicant: TUSIMPLE, INC., San Diego, CA (US)

(72) Inventors: Xiaoling Han, San Diego, CA (US); Kaixin Zheng, San Diego, CA (US); Jay Day, Tucson, AZ (US); Jeffrey Renn, Tucson, AZ (US); Todd Skinner, San Diego, CA (US); Charles A. Price, San Diego, CA (US); Zehua Huang, San Diego, CA (US)

(73) Assignee: TUSIMPLE, INC., San Diego, CA (US)

( * ) Notice: Subject to any disclaimer, the term of this patent is extended or adjusted under 35 U.S.C. 154(b) by 606 days.

(21) Appl. No.: 16/938,279

(22) Filed: Jul. 24, 2020

(65) Prior Publication Data

US 2021/0024092 A1  Jan. 28, 2021

Related U.S. Application Data

(60) Provisional application No. 62/878,131, filed on Jul. 24, 2019, provisional application No. 62/878,118, filed on Jul. 24, 2019.

(51) Int. Cl.
*B60W 60/00* (2020.01)
*B60R 16/03* (2006.01)
(Continued)

(52) U.S. Cl.
CPC ......... *B60W 60/0023* (2020.02); *B60R 16/03* (2013.01); *B60W 10/08* (2013.01);
(Continued)

(58) Field of Classification Search
CPC .. B60W 60/00; B60W 60/0023; B60W 10/08; B60W 10/18; B60W 10/20;
(Continued)

(56) References Cited

U.S. PATENT DOCUMENTS 6,044,923 A * 4/2000 Reagan .................. H02J 7/1423
180/65.265
2015/0375698 A1  12/2015 Joao
(Continued)

FOREIGN PATENT DOCUMENTS

EP  3372438 A1  9/2018

OTHER PUBLICATIONS

Albertsson, Gustav. EP20187400.5 Extended European Search Report Mailed Dec. 23, 2020, pp. 1-12.
(Continued)

*Primary Examiner* — Daniel Kessie
*Assistant Examiner* — Terrence R Willoughby
(74) *Attorney, Agent, or Firm* — Perkins Coie LLP

(57) ABSTRACT

Described are devices, systems and methods for managing power generation, storage and/or distribution in autonomous vehicles. In some aspects, a system for power management in an autonomous vehicle having a main power source and one or more alternators includes a vehicle control unit, a secondary power source, and a power management unit. In some embodiments, the power management unit is configured on an autonomous vehicle having a single alternator-charging system for battery charging and battery power control with different battery packs. In some embodiments, the power management unit is configured on an autonomous vehicle having multiple alternator-charging systems for battery charging and battery power control for different battery packs.

20 Claims, 8 Drawing Sheets

(51) Int. Cl.
*B60W 10/08* (2006.01)
*B60W 10/18* (2012.01)
*B60W 10/20* (2006.01)
*B60W 10/26* (2006.01)
*B60W 40/105* (2012.01)

(52) U.S. Cl.
CPC ............ *B60W 10/18* (2013.01); *B60W 10/20* (2013.01); *B60W 10/26* (2013.01); *B60W 40/105* (2013.01); *B60W 2510/0638* (2013.01); *B60W 2510/244* (2013.01); *B60W 2520/00* (2013.01); *B60W 2530/00* (2013.01)

(58) Field of Classification Search
CPC ............... B60W 10/26; B60W 40/105; B60W 2510/0638; B60W 2510/244; B60W 2520/00; B60W 2530/00; B60R 16/03; B60R 16/0307; B60L 2260/32; B60L 1/00; B60L 58/18; B60L 58/21; B60L 3/0092; B60L 58/10; Y02T 10/70; Y02T 90/40; B62J 45/00

See application file for complete search history.

(56) References Cited

U.S. PATENT DOCUMENTS

| | | | |
|---|---|---|---|
| 2018/0120841 A1* | 5/2018 | Endo | B60W 10/08 |
| 2018/0229609 A1 | 8/2018 | Hudson | |
| 2019/0023149 A1* | 1/2019 | Chen | H02J 7/34 |
| 2019/0135208 A1* | 5/2019 | Joao | H02J 7/1423 |
| 2019/0296546 A1* | 9/2019 | Smith | H02M 3/04 |
| 2020/0047624 A1* | 2/2020 | Tsai | B60Q 1/46 |
| 2020/0070801 A1* | 3/2020 | Staats | B60L 58/12 |

OTHER PUBLICATIONS

European Patent Office, Communication pursuant to Article 94(3) EPC for Appl. No. 20187400.5, mailed on Sep. 4, 2024.

* cited by examiner

BATTERY POWER CONTROL IN AUTONOMOUS VEHICLES HAVING ALTERNATOR-CHARGING SYSTEMS

CROSS-REFERENCE TO RELATED APPLICATIONS

This patent document claims priorities to and benefits of U.S. Provisional Patent Application No. 62/878,118 titled "BATTERY POWER CONTROL IN AUTONOMOUS VEHICLES HAVING SINGLE ALTERNATOR-CHARGING SYSTEM" filed on Jul. 24, 2019 and U.S. Provisional Patent Application No. 62/878,131 titled "BATTERY POWER CONTROL IN AUTONOMOUS VEHICLES HAVING MULTIPLE ALTERNATOR-CHARGING SYSTEMS" filed on Jul. 24, 2019. The entire content of the aforementioned patent application is incorporated by reference as part of the disclosure of this patent document.

TECHNICAL FIELD

This patent document relates to power management of autonomous vehicles.

BACKGROUND

Autonomous or "self-driving" vehicles are vehicles capable of sensing their environment and moving without a human driver in control. Autonomous vehicles use navigation technology for sensing the position and movement of a vehicle and, based on the sensing, autonomously controlling the vehicle to navigate towards a destination. Autonomous vehicle navigation can have important applications in transportation of people, goods and services.

SUMMARY

Disclosed are devices, systems and methods for managing power generation, storage and/or distribution in autonomous vehicles. In some aspects of the disclosed technology, a power management system is configured on an autonomous vehicle having a single alternator-charging system for battery charging and battery power control with different battery packs. In some aspects of the disclosed technology, a power management system is configured on an autonomous vehicle having multiple alternator-charging systems for battery charging and battery power control for different battery packs.

In some embodiments, a system for power management in an autonomous vehicle having a main power source and one or more alternators includes a vehicle control unit comprising a processor and memory, the vehicle control unit configured to provide control signals to (i) main subsystems of an autonomous vehicle including a steering subsystem, a throttle subsystem and a braking subsystem and (ii) autonomous control modules of the autonomous vehicle including a steering control module, a throttle control module and a braking control module to autonomously drive the autonomous vehicle, wherein the main subsystems of the autonomous vehicle are supplied electrical power from the main power source of the autonomous vehicle; a secondary power source electrically connected to one or both of the main power source and the one or more alternators of the autonomous vehicle to obtain electrical power, the secondary power source in communication with the vehicle control unit to supply the electrical power to at least some of the autonomous control modules; and a power management unit comprising a processor and memory, the power management unit configured to (i) independently regulate an electrical power charging process of the main power source and the secondary power source and (ii) independently regulate electrical power distribution to the main subsystems of the autonomous vehicle and to the at least some of the autonomous control modules of the autonomous vehicle.

In some aspects, a system for power management in an autonomous vehicle having a main power source coupled to an alternator is disclosed. The system comprises a vehicle control unit comprising a processor and memory, the vehicle control unit configured to provide control signals to (i) main subsystems of a vehicle including a steering subsystem, a throttle subsystem and a braking subsystem and (ii) autonomous control modules of the vehicle including a steering control module, a throttle control module and a braking control module to autonomously drive the vehicle, wherein the main subsystems of the vehicle are supplied electrical power from the main power source; a secondary power source electrically connected to the main power source of the vehicle and to the vehicle control unit to supply electrical power to at least some of the autonomous control modules; and a power management unit comprising a processor and memory, the power management unit configured to (i) independently regulate an electrical power charging process of the main power source and the secondary power source and (ii) independently regulate electrical power distribution to the main subsystems of the vehicle and to the at least some of the autonomous control modules of the vehicle.

In some aspects, a system for power management in an autonomous vehicle having a main power source coupled to a first alternator includes a vehicle control unit comprising a processor and memory, the vehicle control unit configured to provide control signals to (i) main subsystems of a vehicle including a steering subsystem, a throttle subsystem and a braking subsystem and (ii) autonomous control modules of the vehicle including a steering control module, a throttle control module and a braking control module to autonomously drive the vehicle, wherein the main subsystems of the vehicle are supplied electrical power from the main power source; a secondary power source electrically connected to a second alternator of the vehicle and to the vehicle control unit to supply electrical power to at least some of the autonomous control modules; and a power management unit comprising a processor and memory, the power management unit configured to (i) independently regulate an electrical power charging process of the main power source and the secondary power source and (ii) independently regulate electrical power distribution to the main subsystems of the vehicle and to the at least some of the autonomous control modules of the vehicle.

In some embodiments in accordance with the present technology, a method for power management of an autonomous vehicle includes independently regulating, by a power management unit comprising a processor and a memory and resident in an autonomous vehicle, an electrical power charging process of a main power source of the autonomous vehicle and a secondary power source implemented on the autonomous vehicle; and independently regulating, by the power management unit, an electrical power distribution process to at least some of main subsystems of the autonomous vehicle and to the at least some of autonomous control modules of the autonomous vehicle, wherein the main subsystems of the autonomous vehicle include a steering subsystem, a throttle subsystem and a braking subsystem and wherein the autonomous control modules of the autonomous vehicle include a steering control module, a throttle control module and a braking control module to autonomously drive the vehicle.

The subject matter described in this patent document can be implemented in specific ways that provide one or more of the following features.

BRIEF DESCRIPTION OF THE DRAWINGS

FIG. 1 shows a diagram of an example autonomous vehicle, embodied as a semi-trailer truck (also referred to as a tractor-trailer), equipped with control systems for autonomous functionalities, such as front- and/or rear-facing perception system installed on.

DETAILED DESCRIPTION

Autonomous vehicles can have multiple control systems working integrally and/or independently to control various modules and subsystems of the vehicle, such as the drivetrain, power steering, vehicle sensors (e.g., engine temperature sensor, oil pressure sensor, etc.), environmental sensors to perceive the surroundings (e.g., radar, LIDAR, sonar, inertial measurement units including accelerometers and/or rate sensors, etc.) and other modules and subsystems. Yet, vehicles typically have one type of power source, i.e., a battery, to power all of the modules and subsystems of the vehicle; and the battery is typically charged by a single alternator of the vehicle.

The dependency on a single power source to supply power to the vehicle's main modules and subsystems as well as the vehicle's autonomous control modules and subsystems can be problematic for several reasons, including safety, energy efficiency, and power management. As an illustrative example, if a vehicle's alternator were to fail while driving, the battery will typically drain rapidly and power to the spark plug will be cut off, upon which the power of the vehicle will cease. In a driver-controlled vehicle, a driver can react to such a situation to safely pull the vehicle to the side of the road. However, in an autonomous vehicle having a single power source, the very subsystems that both monitor the surroundings and operate the self-driving of the vehicle may be inoperable when the vehicle's power is terminated. In such a situation, the vehicle would no longer be under control of the autonomous control system, dramatically raising the risk that the vehicle will safely be brought to a stop. As such, an intelligent power management system is needed for autonomous vehicles.

Disclosed are devices, systems and methods for managing power generation, storage and/or distribution in autonomous vehicles. In some aspects of the disclosed technology, a power management system is configured on an autonomous vehicle having a single alternator-charging system for battery charging and battery power control with different battery packs. In some aspects of the disclosed technology, a power management system is configured on an autonomous vehicle having multiple alternator-charging systems for battery charging and battery power control, including autonomous vehicle having different battery packs.

Figure 1:
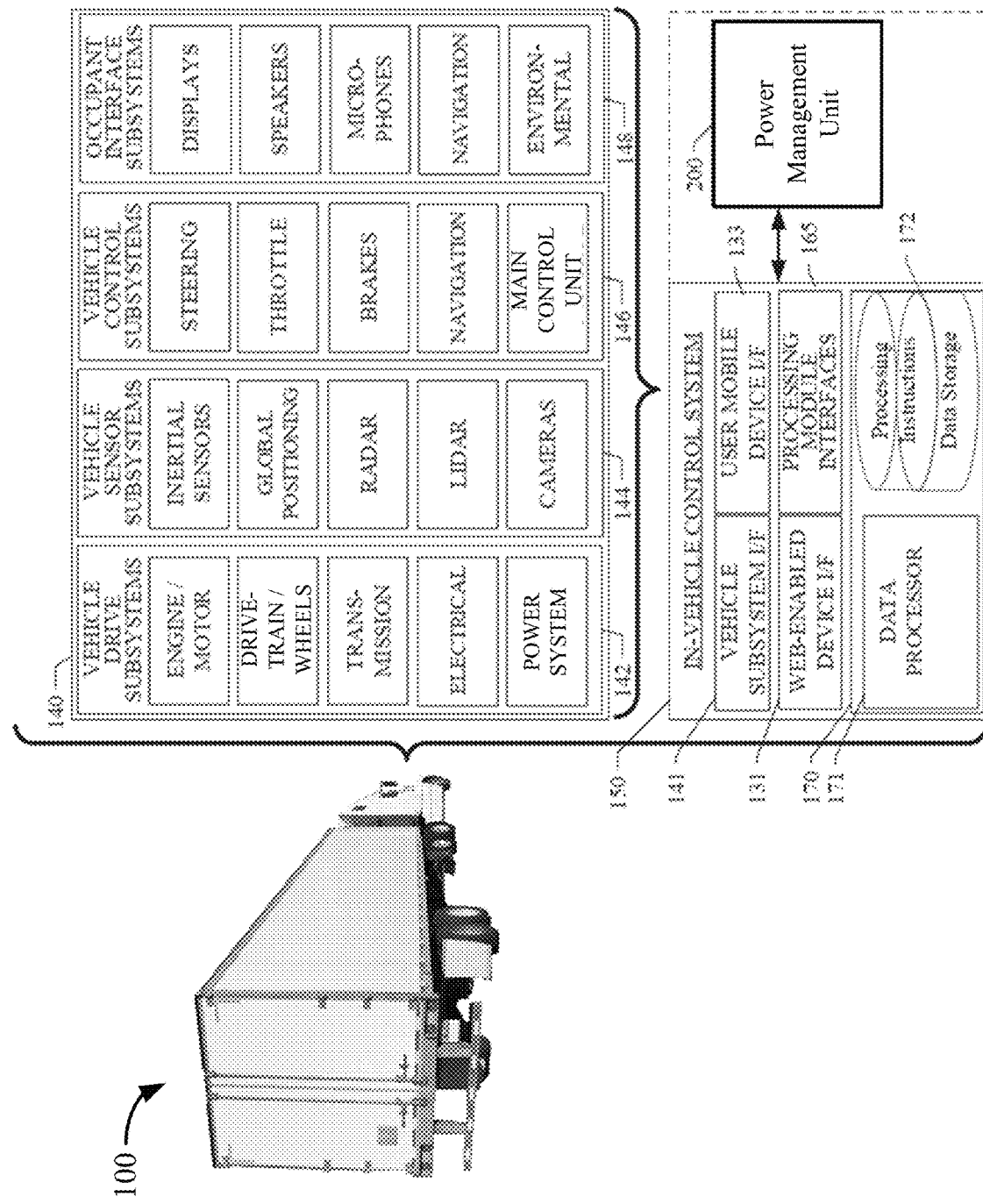

FIG. 1 shows a diagram of an example autonomous vehicle 100, embodied as a semi-trailer truck (also referred to as a tractor-trailer), equipped with control systems for autonomous functionalities, such as front-, side- and/or rear-facing perception system installed on the autonomous vehicle 100 in communication with self-driving systems that is controlled by a vehicle control unit, which are at least partly embodied in computing device(s) installed on the vehicle, and which may be partly embodied in remote computing device(s) in communication with the vehicle-installed computing device(s).

In an example embodiment as described herein, an autonomous vehicle can include an in-vehicle control system 150, also referred to as a vehicle control unit (VCU), which can be in data communication with a plurality of vehicle subsystems 140 resident in the vehicle 100, and which can be in data communication with a power management unit 200. The in-vehicle control system 150 can include a vehicle subsystem interface 141 to facilitate data communication between the in-vehicle control system 150 and the plurality of vehicle subsystems 140. The in-vehicle control system 150 can be configured to include a data processor 171 to execute instructions and data for autonomous vehicle control, including processing data received from one or more of the vehicle subsystems 140. The data processor 171 can be combined with a data storage device 172 as part of a computing system 170 in the in-vehicle control system 150. The data storage device 172 can be used to store data, processing parameters, and data processing instructions.

The data processor 171 is configured to execute instructions and data associated with the power management unit 200. As shown by the dashed lines in FIG. 1, the power management unit 200 can be integrated into the in-vehicle control system 150 or optionally downloaded to the in-vehicle control system 150. In some embodiments of the in-vehicle control system 150, a processing module interface 165 can be provided to facilitate data communications between the data processor 171 and the power management unit 200. In some implementations, the power management unit 200 is configured to specify the sequence of turning on/off the power and/or regulating the level of power provided to individual modules of the autonomous vehicle 100. In some implementations, the power management unit 200 is configured to monitor power and/or current consumption and/or voltage change of the individual modules to detect failure modes or regular operation/performance by the modules.

In some embodiments, the main vehicle battery (that is connected to the vehicle's alternator) provides power to the vehicle's main modules and subsystems (e.g., engine, drivetrain, power steering, vehicle sensors such as the engine temperature sensor, oil pressure sensor, etc.), and a secondary battery of the vehicle connected to the vehicle's alternator provides power to the in-vehicle control system 150 that is regulated by the power management unit 200.

In this manner, power to the autonomous vehicle driving control modules of the VCU are provided and regulated independent from the power provided to the vehicle's main modules and subsystems. Example embodiments of the VCU power management system are discussed in further detail in connection with FIGS. 2, 3A and 4A.

As illustrated in FIG. 1, the autonomous vehicle 100 may include various vehicle subsystems such as a vehicle drive subsystem 142, a vehicle sensor subsystem 144, and a vehicle control subsystem 146. The autonomous vehicle 100 can optionally include an occupant interface subsystem 148. The autonomous vehicle 100 may include more or fewer subsystems, and each subsystem could include multiple elements. Further, each of the subsystems and elements of the autonomous vehicle 100 can be interconnected. Thus, one or more of the described functions of the autonomous vehicle 100 may be divided up into additional functional or physical components or combined into fewer functional or physical components. In some further examples, additional functional and physical components may be added to the examples illustrated by FIG. 1.

The vehicle drive subsystem 142 may include components operable to provide powered motion for the autonomous vehicle 100. In an example embodiment, the vehicle drive subsystem 142 may include an engine or motor, drivetrain, wheels/tires, a transmission, a power system that includes a power source and energy storage, and electrical subsystem, e.g., including the alternator. The engine or motor may be any combination of an internal combustion engine, an electric motor, steam engine, fuel cell engine, propane engine, or other types of engines or motors. In some example embodiments, the engine may be configured to convert a power source into mechanical energy. In some example embodiments, the vehicle drive subsystem 142 may include multiple types of engines or motors. For instance, a gas-electric hybrid car could include a gasoline engine and an electric motor. Other examples are possible.

The wheels of the autonomous vehicle 100 may be standard tires. The wheels of the autonomous vehicle 100 may be configured in various formats, including a unicycle, bicycle, tricycle, or a four-wheel format, such as on a car or a truck, for example. Other wheel geometries are possible, such as those including six or more wheels. Any combination of the wheels of autonomous vehicle 100 may be operable to rotate differentially with respect to other wheels. The wheels may represent at least one wheel that is fixedly attached to the transmission and at least one tire coupled to a rim of the wheel that could make contact with the driving surface. The wheels may include a combination of metal and rubber, or another combination of materials. The transmission may include elements that are operable to transmit mechanical power from the engine to the wheels. For this purpose, the transmission could include a gearbox, a clutch, a differential, and drive shafts. The transmission may include other elements as well. The drive shafts may include one or more axles that could be coupled to one or more wheels.

The power system may represent a source of energy that may, in full or in part, power the engine or motor and store energy for the vehicle. The power system also provides energy for other subsystems of the autonomous vehicle 100, typically by an electrical power source. In the embodiment shown in FIG. 1, an electrical power source includes a battery. Other examples of power sources that can power the engine or motor can include gasoline, diesel, other petroleum-based fuels, propane, other compressed gas-based fuels, ethanol, fuel cell, solar panels, batteries, and other sources of electrical power. The power source could additionally or alternatively include any combination of fuel tanks, batteries, capacitors, or flywheels. The electrical system may include elements that are operable to transfer and control electrical signals in the autonomous vehicle 100. These electrical signals can be used to activate lights, servos, electrical motors, and other electrically driven or controlled devices of the autonomous vehicle 100.

The vehicle sensor subsystem 144 may include a number of sensors configured to sense information or perception data related to an environment or condition of the autonomous vehicle 100. For example, the vehicle sensor subsystem 144 may include an inertial measurement unit (IMU), a Global Positioning System (GPS) transceiver, a RADAR unit, a laser range finder/LIDAR unit, and one or more cameras or image capture devices. The vehicle sensor subsystem 144 may also include sensors configured to monitor internal systems of the autonomous vehicle 100 (e.g., an 02 monitor, a fuel gauge, an engine oil temperature). Other sensors are possible as well. One or more of the sensors included in the vehicle sensor subsystem 144 may be configured to be actuated separately or collectively in order to modify a position, an orientation, or both, of the one or more sensors.

The IMU may include any combination of sensors (e.g., accelerometers and gyroscopes) configured to sense position and orientation changes of the autonomous vehicle 100 based on inertial acceleration. The GPS transceiver may be any sensor configured to estimate a geographic location of the autonomous vehicle 100. For this purpose, the GPS transceiver may include a receiver/transmitter operable to provide information regarding the position of the autonomous vehicle 100 with respect to the Earth. The RADAR unit may represent a system that utilizes radio signals to sense objects within the local environment of the autonomous vehicle 100. In some embodiments, in addition to sensing the objects, the RADAR unit may additionally be configured to sense the speed and the heading of the objects proximate to the autonomous vehicle 100. The laser range finder or LIDAR unit may be any sensor configured to sense objects in the environment in which the autonomous vehicle 100 is located using lasers. In an example embodiment, the laser range finder/LIDAR unit may include one or more laser sources, a laser scanner, and one or more detectors, among other system components. The laser range finder/LIDAR unit could be configured to operate in a coherent (e.g., using heterodyne detection) or an incoherent detection mode. The cameras may include one or more devices configured to capture a plurality of images of the environment of the autonomous vehicle 100. The cameras may be still image cameras or motion video cameras.

The vehicle control subsystem 146 may be configured to control operation of the autonomous vehicle 100 and its components. Accordingly, the vehicle control system 146 may include various elements such as a steering unit, a throttle, a brake unit, a navigation unit, and a main autonomous control unit. The steering unit may represent any combination of mechanisms that may be operable to adjust the heading of autonomous vehicle 100. The throttle may be configured to control, for instance, the operating speed of the engine and, in turn, control the speed of the autonomous vehicle 100. The brake unit can include any combination of mechanisms configured to decelerate the autonomous vehicle 100. The brake unit can use friction to slow the wheels in a standard manner. In other embodiments, the brake unit may convert the kinetic energy of the wheels to electric current. The brake unit may take other forms as well. The navigation unit may be any system configured to determine a driving path or route for the autonomous vehicle 100. The navigation unit may additionally be configured to update the driving path dynamically while the autonomous vehicle 100 is in operation. In some embodiments, the navigation unit may be configured to incorporate data from a GPS transceiver and/or one or more predetermined maps so as to determine the driving path for the autonomous vehicle 100.

The vehicle control subsystem can include a main control unit configured to identify, evaluate, and avoid or otherwise negotiate potential obstacles in the environment of the autonomous vehicle 100. In general, the main control unit may be configured to control the autonomous vehicle 100 for operation without a driver or to provide driver assistance in controlling the autonomous vehicle 100. In some embodiments, the main autonomous control unit may be configured to incorporate data from the GPS transceiver, the RADAR, the LIDAR, the cameras, and/or other vehicle subsystems to determine a driving path or trajectory for the autonomous vehicle 100. The vehicle control system 146 may additionally or alternatively include components other than those shown and described.

The optional occupant interface subsystems 148 may be configured to allow interaction between the autonomous vehicle 100 and external sensors, other vehicles, other computer systems, and/or an occupant or user of autonomous vehicle 100. For example, the occupant interface subsystems 148 may include standard visual display devices (e.g., plasma displays, liquid crystal displays (LCDs), touch-screen displays, heads-up displays, or the like), speakers or other audio output devices, microphones or other audio input devices, navigation interfaces, and interfaces for controlling the internal environment (e.g., temperature, fan, etc.) of the autonomous vehicle 100.

In some embodiments of the in-vehicle control system 150, a web-enabled device interface 131 can be provided to facilitate data communications between the in-vehicle control system 150 and an external network 120 via a web-enabled device of the autonomous vehicle 100 (not shown), such as a network of computers in communication with each other, including the cloud. Similarly, in some embodiments of the in-vehicle control system 150, a user mobile device interface 133 can be provided to facilitate data communication between the in-vehicle control system 150 and the external network via a user mobile device (not shown). In this manner, the in-vehicle control system 150 can obtain real-time access to network resources via network, which can be used to obtain processing modules for execution by data processor 171, data content to train internal neural networks, system parameters, or other data.

Figure 2:
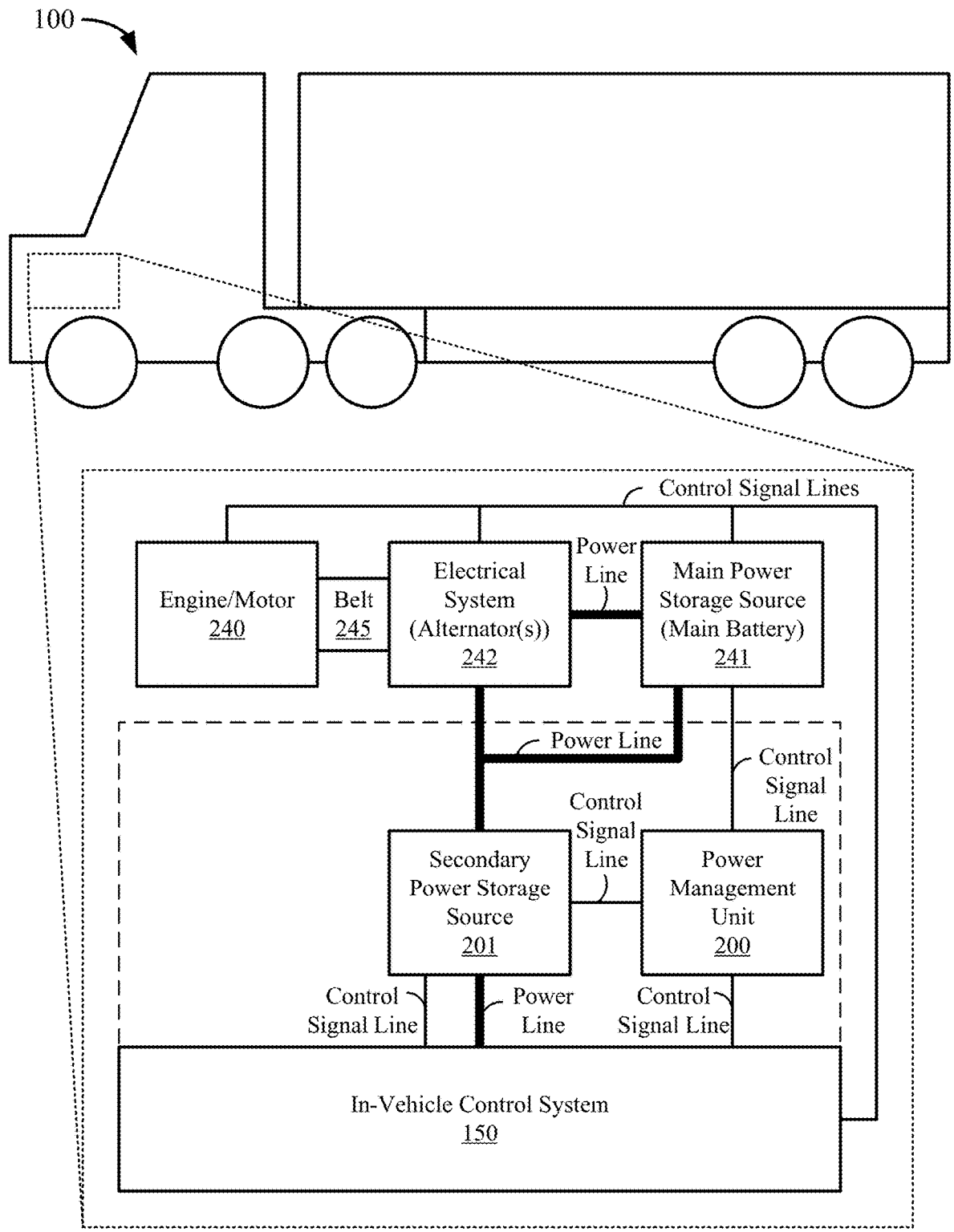
FIG. 2 shows a diagram of an example embodiment of a power management system for an autonomous vehicle in accordance with the present technology.

FIG. 2 shows a diagram of an example embodiment of a VCU power management system for the autonomous vehicle 100. In implementations, the VCU power management system can be included or integrated with the in-vehicle control system 150. The VCU power management system is configured to operate with systems, subsystems and/or components of the autonomous vehicle. As shown in the diagram, a main power storage source 241 (e.g., main battery) of the autonomous vehicle 100 that is in electrical communication with an electrical system 242 (e.g., one or more alternators) via an electrical power line (e.g., cable), and where the electrical system 242 is coupled to the main engine 240 of the autonomous vehicle 100, e.g., via a cable or belt 245 (e.g., one or more alternator belts corresponding to the one or more alternators). The VCU power management system includes the power management unit 200, which includes a data processing unit comprising one or more processors in communication with one or more memory units, in which the power management unit 200 is configured to (i) independently regulate an electrical power charging process of the main power source and a secondary power source and (ii) independently regulate electrical power distribution to the main subsystems of the autonomous vehicle and to the at least some of the autonomous control modules of the autonomous vehicle, e.g., via the in-vehicle control system 150.

As shown in the diagram of FIG. 2 for the example embodiment, the VCU power management system includes a secondary power storage source 201 is electrically connected to the main power storage source 241 and/or the electrical system 242 (e.g., to one or more alternators) of the autonomous vehicle 100. The secondary power storage source 201 is configured to obtain electrical power from either or both of the main power storage source 241 and/or the electrical system 242. The secondary power storage source 201 is in electrical communication with the in-vehicle control system 150 to supply the electrical power to at least some of the autonomous control modules. The secondary power storage source 201 is in data communication with the in-vehicle control system 150 and the power management unit 200. In some embodiments, the secondary power storage source 201 includes an autonomous driving system (ADS) battery).

Other example embodiments of the VCU power management system of FIG. 2 are shown and discussed in relation to FIGS. 3A-3B and FIGS. 4A-4B.

Figure 3A:
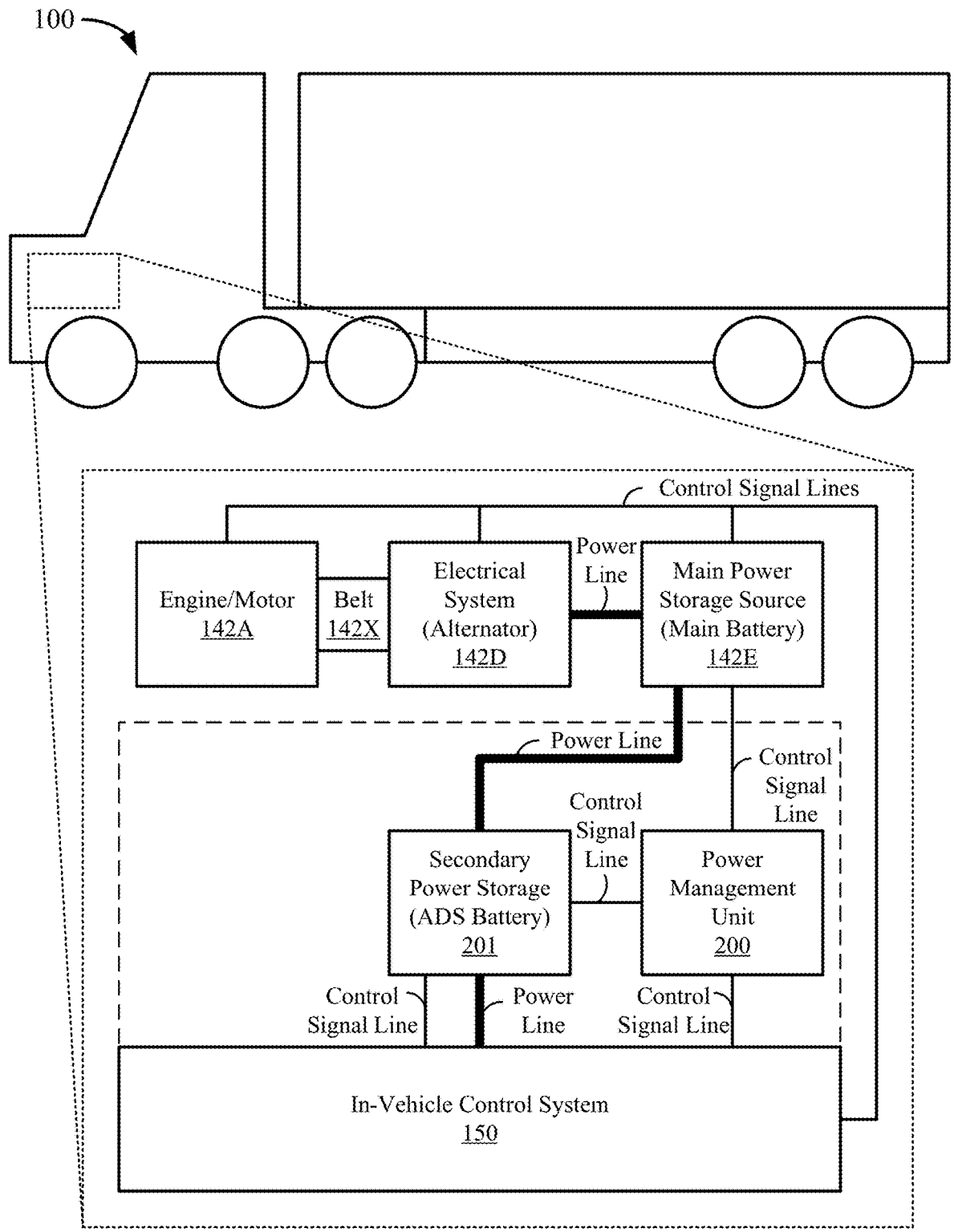
FIG. 3A shows a diagram of an example embodiment of a power management unit in accordance with the present technology integrated with a power system of an autonomous vehicle, such as the example semi-trailer truck shown in FIG. 1.

FIG. 3A shows a diagram of an example embodiment of the power management unit 200 in communication with the power system of the autonomous vehicle 100, particularly a main power storage source 142E (e.g., main battery), and with a secondary power storage source 201 of the in-vehicle control system 150 (e.g., an autonomous driving system (ADS) battery) and the in-vehicle control system 150 (e.g., via the processing module interface 165). The main power storage source 142E is in electrical communication, via an electrical power line (e.g., cable), with an electrical system charging device 142D (e.g., a single alternator) of the autonomous vehicle 100. In this example, the electrical system charging device 142D is coupled to an engine/motor 142A of the autonomous vehicle 100 via a belt 142X (e.g., alternator belt) to actuate electrical energy generation by the electrical system charging device 142D via mechanical energy from the engine/motor 142A. In other example embodiments, the electrical system charging device 142D can include other types of electrical energy generation devices alternative or in addition to an alternator. The secondary power storage source 201 is in electrical communication with the main power storage source 142E, via an electrical power line (e.g., cable).

The in-vehicle control system 150 is in data communication, via control signal lines, with the modules of the vehicle drive subsystem 142, including the engine/motor 142A, electrical system charging device 142D and/or the main power storage source 142E, as depicted in FIG. 3A. In the example shown in FIG. 3A, the power management unit 200 is in data communication with the in-vehicle control system 150 and with the main power storage source 142E (e.g., main battery of the vehicle) and the secondary power storage source 201 (e.g., ADS battery). In some embodiments, the in-vehicle control system 150 is in data communication with the secondary power storage source 201.

The example embodiment shown in FIG. 3A illustrates the power management unit 200 configured on the autonomous vehicle 100 having a single alternator-charging system, in which the power management unit 200 is able to regulate the battery charging process of the two separate power storage sources (i.e., power storage source 142E and secondary power storage source 201). In this configuration, the power management unit 200 is operable to regulate the power distribution (i.e., control of power from the battery) to the respective modules of the in-vehicle control system 150 and of the vehicle's main subsystems, independently. Furthermore, the power management unit 200 is operable to regulate the charging process and regulate the power distribution from different battery packs among each of the main battery and the secondary battery. For example, the main battery can include individual battery packs that form a battery set, e.g., such as four battery packs for the main battery and/or four battery packs for the secondary battery, where each individual battery can be monitored and controlled separately by the power management unit 200.

In some implementations, the power management unit 200 measures the state of charge (SOC) of each power source individually, e.g., the main power storage source 142E and the secondary power storage source 201. For example, when the engine/motor 142A is on and the example alternator 142D is healthy, the power management unit 200 opens the relay between the main power storage source 142E (e.g., main battery) and the secondary power storage source 201 (e.g., secondary battery), which causes the secondary battery to start charging. In some implementations, for example, when an outside power source or shore power (e.g., outside AC power input) is plugged in, the power management unit 200 can also open the charging loop to let the secondary battery receive current.

In some implementations, when the voltage or SOC of the main power storage source 142E (e.g., main battery) is determined to be below a certain level, e.g., which can be determined by the power management unit 200 and/or the in-vehicle control system 150, the power management unit 200 can cut down the relay between the main power storage source 142E and the secondary power storage source 201 (e.g., secondary battery) to prevent over-discharging of the main battery.

In some implementations, the in-vehicle control system 150 can control the power up/down sequence and also control an after run power distribution (e.g., when the autonomous vehicle is no longer in motion for a trip). In such situations, for example, when there is no requirement of any specific components, the in-vehicle control system 150 could turn off the power supply. For example, during a data offload operation when the vehicle is not in motion, there is no need to open LIDAR and/or other camera or sensors, so the VCU can turn off the power supply of these channels.

Figure 3B:
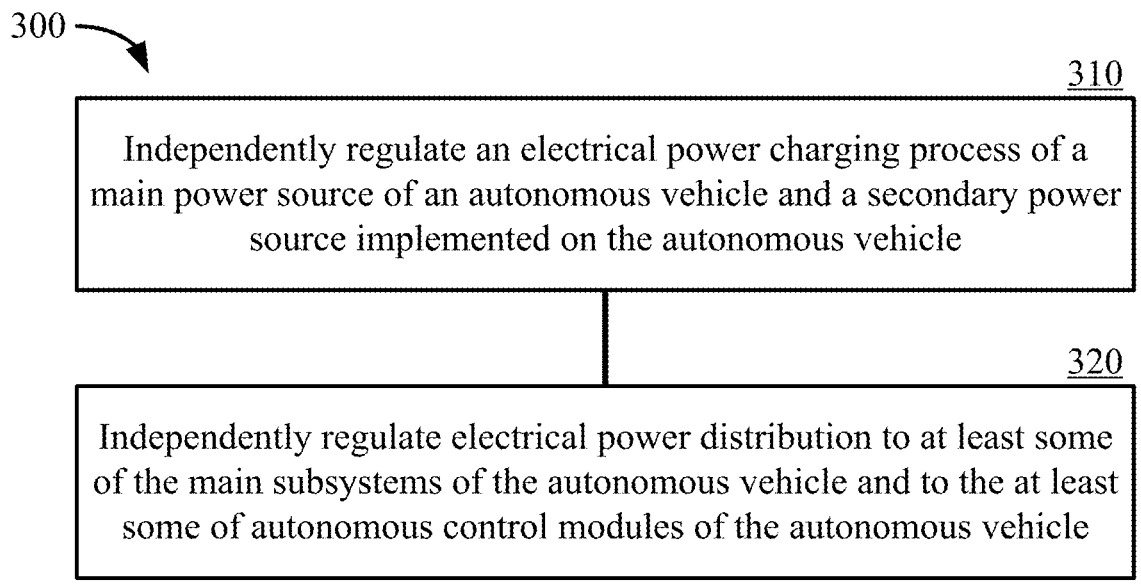
FIG. 3B shows a flow diagram of an example embodiment of a method for power management of the autonomous vehicle in accordance with embodiments of the power management unit of FIG. 3A.

FIG. 3B shows a flow diagram of an example embodiment of a method 300 for power management of the autonomous vehicle 100. In various examples, the method 300 can be implemented by the power management unit 200. The method 300 includes a process 310 to independently regulate an electrical power charging process of a main power source of the autonomous vehicle 100 (e.g., main power storage source 142E) and a secondary power source (e.g., secondary power storage source 201) implemented on the autonomous vehicle 100. The method 300 includes a process 320 to independently regulate electrical power distribution to at least some of the main subsystems of the autonomous vehicle 100 and to the at least some of the autonomous control modules of the autonomous vehicle 100.

In some implementations of the process 310, for example, the power management unit 200 determines an operation of an alternator coupled to the secondary power source and opens a relay between the secondary power source and the main power source to allow charging of the secondary power source from the main power source. In an illustrative example, when the engine/motor 142A of the autonomous vehicle 100 is on and the alternator (e.g., alternator 142D) is operating at a healthy state, the process 310 can be implemented by the power management unit 200 to determine the healthy state of the alternator and open the relay between the main power storage source 142E (e.g., main battery) and the secondary power storage source 201 (e.g., secondary battery), which causes the secondary battery to start charging. Also, for example, the process 310 can be implemented by the power management unit 200 to determine when an outside power source or shore power (e.g., outside AC power input) is plugged in and open the charging loop to let the secondary battery receive current.

In some implementations of the process 310, for example, the power management unit 200 determines a state of charge (SOC) of the main power source is below a threshold (e.g., a threshold predetermined, which can be stored in the memory of the power management unit 200) and closes a relay between the secondary power source and the main power source to prevent over-discharging the main power source. In an illustrative example, the power management unit 200 can determine when the voltage or SOC of the main power storage source 142E (e.g., main battery) is below the predetermined threshold and shut down (e.g., close) the relay between the main power storage source 142E and the secondary power storage source 201 (e.g., secondary battery), thereby preventing over-discharging of the main battery.

In some implementations of the process 310, for example, the power management unit 200 determines that an outside power source is connected to one or both of the main power source and the secondary power source and opens a charging loop to allow the one or both of the main power source and the secondary power source to receive current. In an illustrative example, the power management unit 200 can determine when the main power storage source 142E (e.g., main battery) and/or the secondary power storage source 201 (e.g., second battery) is in connection to an outside power source, e.g., via a measured voltage, and manages the charging of the main power storage source 142E and/or the secondary power storage source 201.

In some implementations of the process 310, for example, the power management unit 200 receives instructions from the in-vehicle control system 150 to control the power up/down sequence and also control an after-run power distribution of the autonomous vehicle, such as providing power to certain modules such as a data management modules for data offload operations when the vehicle is not in motion, while shutting off power to other modules such as cameras, sensors or others that do not require power when the autonomous vehicle is not driving.

Figure 4A:
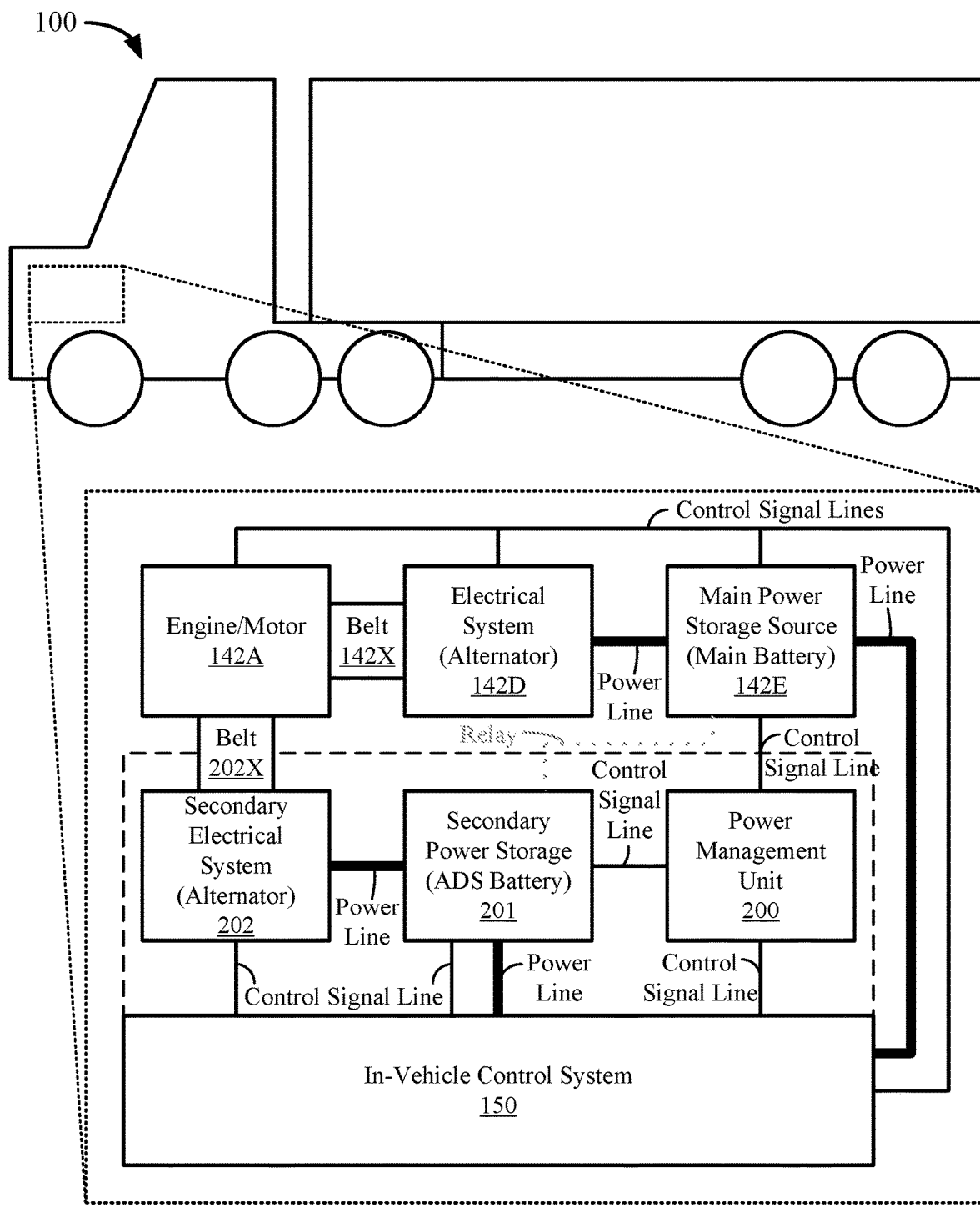
FIG. 4A shows a diagram of another example embodiment of a power management unit in accordance with the present technology integrated with a power system of an autonomous vehicle, such as the example semi-trailer truck shown in FIG. 1.

FIG. 4A shows a diagram of another example embodiment of the power management unit 200 in communication with the power system of the autonomous vehicle 100, particularly the main power storage source 142E (e.g., main battery), and with the secondary power storage source 201 of the in-vehicle control system 150 (e.g., an autonomous driving system (ADS) battery) and the in-vehicle control system 150 (e.g., via the processing module interface 165). The main power storage source 142E is in electrical communication, via an electrical power line (e.g., cable), with the electrical system charging device 142D (e.g., an alternator) of the autonomous vehicle 100, and the secondary power storage source 201 is in electrical communication, via an electrical power line (e.g., cable), with a secondary electrical system charging device 202 (e.g., an alternator). The in-vehicle control system 150 is in electrical communication with both of the main power storage source 142E and the secondary power storage source 201, e.g., via independent power lines (e.g., cables). In some embodiments, the autonomous vehicle 100 includes a relay between the main power storage source 142E and the secondary power storage source 201.

In this example, the electrical system charging device 142D is coupled to the engine/motor 142A of the autonomous vehicle 100 via the belt 142X (e.g., alternator belt) to actuate electrical energy generation by the electrical system charging device 142D via mechanical energy from the engine/motor 142A; and the secondary electrical system charging device 202 is coupled to the engine/motor 142A via a belt 202X (e.g., alternator belt) to actuate electrical energy generation by the secondary electrical system charging device 202 via mechanical energy from the engine/motor 142A. In some embodiments, the belt 142X and 202X can be set up in series via an intermediary shaft such that only one of the belts 142X or 202X is coupled to the engine/motor 142A. For example, the secondary electrical system 202 (e.g., secondary alternator) can be configured to connect to the engine using another belt 202X that is different from the belt 142X that drives the electrical system 142D (e.g., primary alternator); or, in some example embodiments, the secondary electrical system 202 (e.g., secondary alternator) can be configured to connect to the engine by another mechanism, e.g., such as a transmission input axle. In other example embodiments, the electrical system charging device 142D and/or the secondary electrical system charging device 202 can include other types of electrical energy generation devices alternative or in addition to an alternator.

The in-vehicle control system 150 is in data communication, via control signal lines, with the modules of the vehicle drive subsystem 142, including the engine/motor 142A, electrical system charging device 142D and/or the main power storage source 142E, as depicted in FIG. 4A. Similarly, the in-vehicle control system 150 is in data communication with the secondary power storage source 201 and/or the secondary electrical system charging device 202. In the example shown in FIG. 4A, the power management unit 200 is in data communication with the in-vehicle control system 150 and with the main power storage source 142E (e.g., main battery of the vehicle) and the secondary power storage source 201 (e.g., ADS battery).

The example embodiment shown in FIG. 4A illustrates the power management unit 200 configured on the autonomous vehicle 100 having multiple alternator-charging systems, in which the power management unit 200 is able to regulate the battery charging process of the two separate power storage sources (i.e., power storage source 142E and secondary power storage source 201) that receive electrical power generated at separate electrical system charging devices (i.e., electrical system charging device 142D and secondary electrical system charging device 202, respectively). In this configuration, the power management unit 200 is operable to regulate the power distribution (i.e., control of power from the respective batteries) to the respective modules of the in-vehicle control system 150 and of the vehicle's main subsystems, independently. Furthermore, the power management unit 200 is operable to regulate the charging process and regulate the power distribution from different battery packs among each of the main battery and the secondary battery. For example, the main battery can include individual battery packs that form a battery set, e.g., such as four battery packs for the main battery and/or four battery packs for the secondary battery, where each individual battery can be monitored and controlled separately by the power management unit 200.

In some implementations, the power management unit 200 measures the state of charge (SOC) of each power source individually, e.g., the main power storage source 142E and the secondary power storage source 201. The multiple alternator configuration of the system allows the charging process of main power storage source 142E and the secondary power storage source 201 to be controlled independently by the power management unit 200, e.g., by considering one or more factors including, but not limited to, the SOC of each power source, the output power consumption of the modules and/or mechanism electrically connected to the power sources, the internal temperature of the autonomous vehicle 100, the engine speed and/or vehicle speed of the autonomous vehicle 100, current driving application of the autonomous vehicle 100 (e.g., highway vs. surface street), among other factors.

The example of FIG. 4A illustrates an embodiment in which the autonomous vehicle 100 includes two independent electrical system charging devices (e.g., alternators) to generate electrical power to be stored in two power storage sources (e.g., batteries), independently. It is understood that, in some embodiments in accordance with the present technology, the power management unit 200 is configured to independently regulate the electrical power charging process from three (or more) charging devices (e.g., alternators), which can be configured to generate electrical power stored in two (or more) charging devices.

Figure 4B:
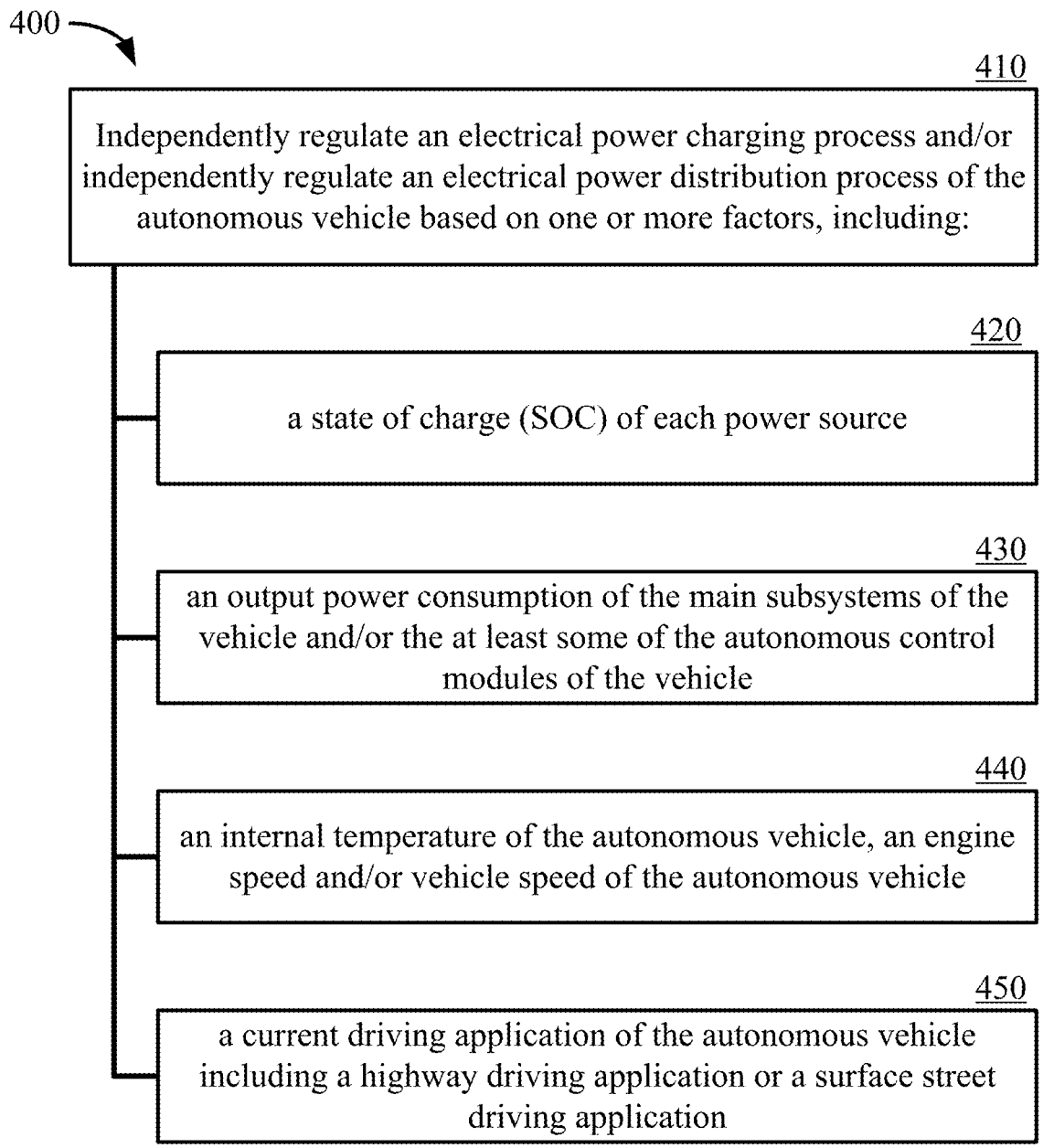
FIG. 4B shows a flow diagram of an example embodiment of a method for power management of the autonomous vehicle in accordance with embodiments of the power management unit of FIG. 4A.

FIG. 4B shows a flow diagram of an example embodiment of a method 400 for power management of the autonomous vehicle 100. In various examples, the method 400 can be implemented by the power management unit 200. The method 400 includes a process 410 to independently regulate the electrical power charging process and/or independently regulate the electrical power distribution based on one or more factors, including but not limited to: (i) a state of charge (SOC) of each power source (420); (ii) an output power consumption of the main subsystems of the vehicle and/or the at least some of the autonomous control modules of the vehicle (430); (ii) an internal temperature of the autonomous vehicle, an engine speed and/or vehicle speed of the autonomous vehicle (440); and/or (iv) a current driving application of the autonomous vehicle including a highway driving application or a surface street driving application (450). In implementations of the process 410, for example, the power management unit 200 receives an input corresponding to the one or more factors. The power management unit 200 processes the input to determine the level of the electrical power charged and/or the level of electrical power to be distributed based on the processed input.

Figure 5:
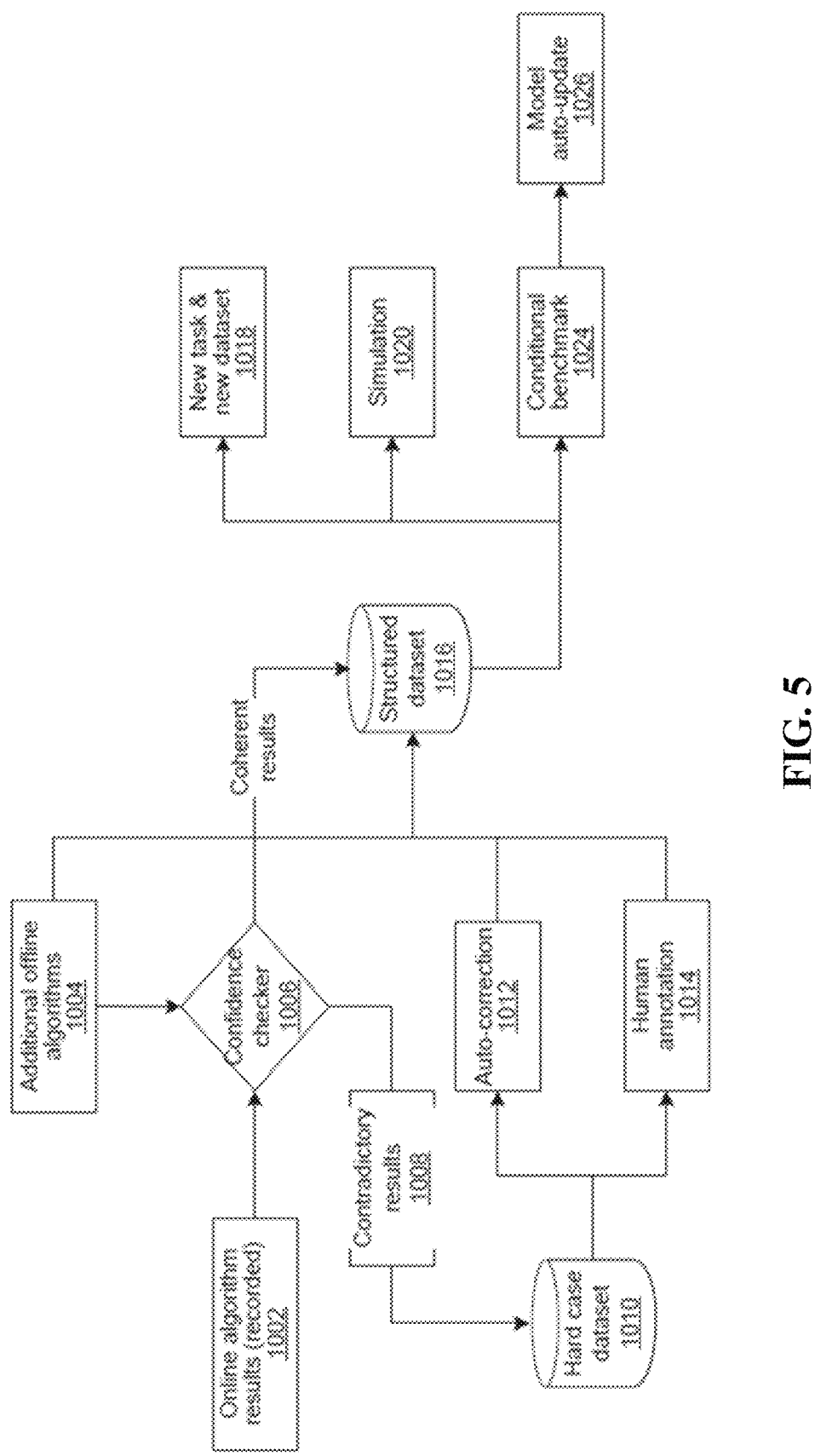
FIG. 5 shows a diagram depicting an exemplary process for updating a software-based control of autonomous vehicles in accordance with the present technology.

FIG. 5 shows a diagram depicting an exemplary process for updating a software-based control of autonomous vehicles, such as the example autonomous vehicle 100 implementing the VCU power management system embodiments shown in FIGS. 2-4B. The exemplary process for updating a software-based control of autonomous vehicles may be implemented by an online server or computer and/or an offline server or computer, for example.

In the exemplary process, such as for updating software-based control of power management of the autonomous vehicle 100, a confidence checker module may perform a confidence checking operation 1006 using online algorithm results 1002 and offline algorithm results 1004 obtained from previous operation of the autonomous vehicle. At operation 1002, a confidence checker module of a computer (e.g., like that shown in FIG. 6) checks a result of online algorithms that have been performed by an in-vehicle control computer to perform autonomous driving related operations. Online algorithm results may include a first set of data that describes autonomous driving operations in response to a known scenario. For example, the first set of data related to autonomous driving operations may include the in-vehicle control computer determining that a steering wheel motor needs to be turned, e.g., 15 degrees clockwise, to steer the autonomous vehicle when the autonomous vehicle reaches a known intersection. The first set of data related to autonomous driving operations may also provide status information of the various aspects of the autonomous vehicle, (e.g., speed, brake amount, transmission gear) when the autonomous vehicle is being driven through the known scenario.

In some embodiments, the online algorithm results may include health status information of the various devices and autonomous driving software operating in the in-vehicle control computer. The health status information may include one or more error codes generated by one or more devices and/or autonomous driving software when the autonomous vehicle was being driven. The online algorithm results may include additional explanation of the reason why the error code was generated and the time when the error code was generated.

At operation 1004, the confidence checker module of the computer receives additional offline algorithms and can process the known scenario with the additional offline algorithm. In some embodiments, the additional offline algorithm may be software code that a developer or engineer has built to debug existing version of the autonomous driving software operating in the in-vehicle control computer. The result of the processing the known scenario with the additional offline algorithm can provide a second set of data that describes simulated autonomous driving operations in response to the known scenario. The second set of data may also include status information of the various aspects of the autonomous vehicle as the autonomous vehicle is simulated through the known scenario. The offline algorithms may have been corrected through intervention by a human operator, as is described in the present document.

The confidence checker module at operation 1006 can compare the first set of data with the second set of data to evaluate how the two versions of the autonomous driving software operate with the same scenario. In some embodiments, the confidence checker module can use techniques such as null hypothesis statistical testing to compare the two sets of data. The confidence checker module can determine one or more metrics that quantify the difference between the two sets of data. If the confidence checker module determines that one or more determined metrics is greater than one or more known thresholds, then the confidence checker module can determine that the difference between the two sets is significant and both sets of data are sent as contradictory results 1008 to a hard case dataset 1010 database in the computer (e.g., computer 600 in FIG. 6).

The auto-correction module can perform auto-correction operation 1012 by determining changes to the existing autonomous driving software to improve the existing autonomous driving software. In some embodiments, the changes may include determining the updates to formula(s) (or equation(s)) and/or machine learning model(s) in the existing autonomous driving software that may need to be changed to have the existing autonomous driving software yield the second set of data to the known scenario. In some embodiments, changes may include updates to the machine learning model used by the existing autonomous driving software or updates to image processing techniques to better identify moving objects (e.g., other cars, pedestrians) or static obstacles (e.g., speed bumps, stop signs, etc.,) located in an area surrounding the autonomous vehicle.

The human annotation module can perform the human annotation operation 1014 by sending to a computer monitor the first set of data, the second set of data, the existing autonomous driving software and the additional offline algorithm so that a developer or an engineer can debug or revise the existing autonomous driving software. The formula(s) and/or machine learning model(s) of the revised autonomous driving software obtained from either operation 1012 or 1014 can be sent to the structure dataset database included in the computer. In some embodiments, the human annotation module may send to a computer monitor an image for which a semantic segmentation process yielded one or more regions, where the in-vehicle control computer could not determine the identity of the one or more regions. In such embodiments, a person can assign identities for the one or more regions that the in-vehicle control computer could not identify.

Returning to operation 1006, if the results of the first and second sets of data are determined to be coherent by the confidence checker module, then the coherent results output are sent to the structure dataset 1016. The confidence checker module may determine that the first set of data and second set of data are coherent if one or more metrics that describes the difference between the two sets of data are less than one or more known thresholds. The coherent results output may include value(s), variable(s), formula(s), and/or machine learning model(s) of the existing autonomous driving software.

The value(s), variable(s), and/or formula(s) included in the structure dataset 1016 may be used to analyze new tasks and dataset 1018 or to perform simulation 1020 or to set conditional benchmarks 1024. Operations 1018-1024 may be performed by a data processing module of the computer (e.g., FIG. 11 at 1150). As an example, the data processing module can perform simulation 1020 using images or point cloud data of the known scenario based on the value(s), variable(s), and/or formula(s) stored in the structured dataset 1016. In embodiments where the structured dataset 1016 includes new value(s), variable(s), and/or formula(s) for a revised or debugged autonomous driving software version, the simulation 1020 can be performed on the new value(s), variable(s), and/or formula(s) to assess performance of the revised or debugged autonomous driving software version. For example, the simulations may be used to perform software regression testing.

The data processing module can perform conditional benchmarks 1024 using the value(s), variable(s), and/or formula(s) stored in the structured dataset 1016 for the first set of data (for the existing autonomous driving software) or for the second set of data (for the revised autonomous driving software). In some embodiments, conditional benchmark may be performed by simulating operations of a version of autonomous driving software with camera images and/or LiDAR point cloud data that are previously recorded and stored. The conditional benchmark operation can calculate one or more metrics that characterizes the overall performance of the autonomous driving software. The data processing module can automatically update a model 1026 if the data processing module determines that one or more metrics of the conditional benchmark operation 1024 exceed predetermined threshold(s). A model may include, for example, a revised autonomous driving software or a machine learning model that can be updated by the data processing module.

In some implementations, for example, the exemplary process for updating the software-based control of autonomous vehicles can include evaluating the driving application of the autonomous vehicle 100 and updating the power management unit 200 to optimize the independent control of charging and/or power distribution of the main power storage source 142E and/or the secondary power storage source 201 based on current driving situation of the autonomous vehicle 100 (e.g., whether the autonomous vehicle 100 is being driven on a highway or on surface streets), in real time.

Figure 6:
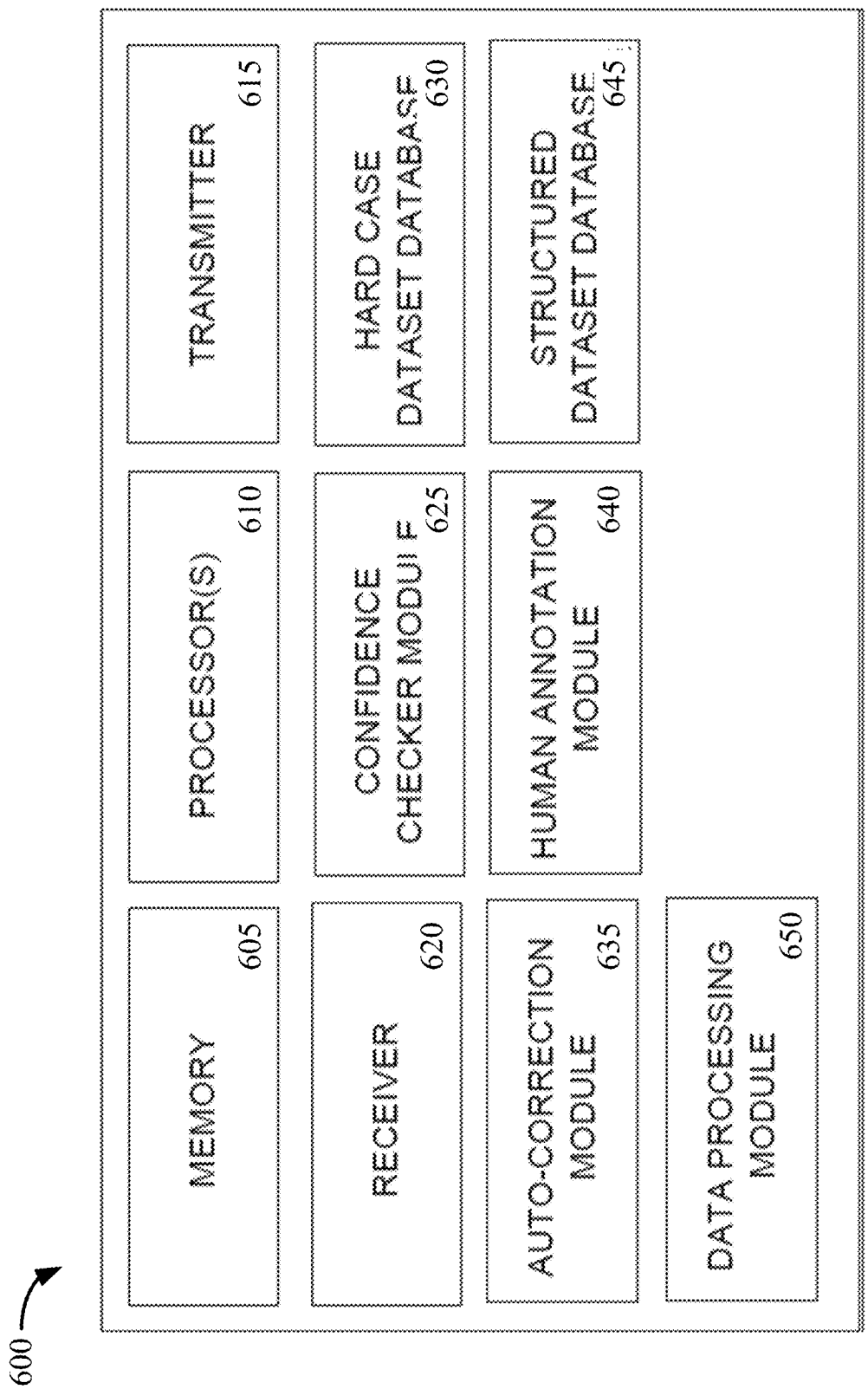
FIG. 6 shows a block diagram of an example embodiment of a computer that can be implemented for computational processes in accordance with the present technology.

FIG. 6 shows an exemplary block diagram of a computer 600 that can be implemented for computational processes, including the method 500 in FIG. 5 to improve software that operates in an autonomous vehicle. The computer 600 includes at least one processor 610 and a memory 605 having instructions stored thereupon. The instructions upon execution by the processor 610 configure the computer 600 and/or the various modules of the computer 600 to perform the operations described in relation to FIGS. 1-5 and in the various embodiments described in this patent document. The transmitter 615 and receiver 620 may send and receive information, respectively.

EXAMPLES

In some embodiments in accordance with the present technology (example 1), a system for power management in an autonomous vehicle having a main power source coupled to an alternator includes: a vehicle control unit comprising a processor and memory, the vehicle control unit configured to provide control signals to (i) main subsystems of a vehicle including a steering subsystem, a throttle subsystem and a braking subsystem and (ii) autonomous control modules of the vehicle including a steering control module, a throttle control module and a braking control module to autonomously drive the vehicle, wherein the main subsystems of the vehicle are supplied electrical power from the main power source; a secondary power source electrically connected to the main power source to obtain electrical power and to the vehicle control unit to supply the electrical power to at least some of the autonomous control modules; and a power management unit comprising a processor and memory, the power management unit configured to (i) independently regulate an electrical power charging process of the main power source and the secondary power source and (ii) independently regulate electrical power distribution to the main subsystems of the vehicle and to the at least some of the autonomous control modules of the vehicle.

Example 2 includes the system of any of the preceding or subsequent examples 1-10, wherein the main power source includes a battery.

Example 3 includes the system of any of the preceding or subsequent examples 1-10, wherein the secondary power source includes a battery.

Example 4 includes the system of any of the preceding or subsequent examples 1-10, wherein the main power source and the secondary power source are different types of power sources.

Example 5 includes the system of example 4, wherein the main power source and the secondary power source are different battery packs.

Example 6 includes the system of any of the preceding or subsequent examples 1-10, wherein the processor and memory of the power management unit includes the processor and memory of the vehicle control unit.

Example 7 includes the system of any of the preceding or subsequent examples 1-10, wherein the power management unit is configured to measure a state of charge (SOC) of each power source individually.

Example 8 includes the system of any of the preceding or subsequent examples 1-10, wherein the power management unit is configured to independently regulate the electrical power charging process of the main power source and the secondary power source by (i) determining an operation of the alternator and (ii) opening a relay between the secondary power source and the main power source to allow charging of the secondary power source from the main power source.

Example 9 includes the system of any of the preceding or subsequent examples 1-10, wherein the power management unit is configured to independently regulate the electrical power charging process of the main power source and the secondary power source by (i) determining a state of charge (SOC) of the main power source is below a threshold and (ii) closing a relay between the secondary power source and the main power source to prevent over-discharging the main power source.

Example 10 includes the system of any of the preceding examples 1-9, wherein the power management unit is configured to independently regulate the electrical power charging process of the main power source and the secondary power source by (i) determining that an outside power source is connected to one or both of the main power source and the secondary power source and (ii) opening a charging loop to allow the one or both of the main power source and the secondary power source to receive current.

In some embodiments in accordance with the present technology (example 11), a system for power management in an autonomous vehicle having a main power source coupled to a first alternator includes a vehicle control unit comprising a processor and memory, the vehicle control unit configured to provide control signals to (i) main subsystems of a vehicle including a steering subsystem, a throttle subsystem and a braking subsystem and (ii) autonomous control modules of the vehicle including a steering control module, a throttle control module and a braking control module to autonomously drive the vehicle, wherein the main subsystems of the vehicle are supplied electrical power from the main power source; a secondary power source electrically connected to a second alternator of the vehicle and to the vehicle control unit to supply electrical power to at least some of the autonomous control modules; and a power management unit comprising a processor and memory, the power management unit configured to (i) independently regulate an electrical power charging process of the main power source and the secondary power source and (ii) independently regulate electrical power distribution to the main subsystems of the vehicle and to the at least some of the autonomous control modules of the vehicle.

Example 12 includes the system of any of the preceding or subsequent examples 1-18, wherein the main power source includes a battery.

Example 13 includes the system of any of the preceding or subsequent examples 1-18, wherein the secondary power source includes a battery.

Example 14 includes the system of any of the preceding or subsequent examples 1-18, wherein the main power source and the secondary power source are different types of power sources.

Example 15 includes the system of example 14, wherein the main power source and the secondary power source are different battery packs.

Example 16 includes the system of any of the preceding or subsequent examples 1-18, wherein the processor and memory of the power management unit includes the processor and memory of the vehicle control unit.

Example 17 includes the system of any of the preceding or subsequent examples 1-18, wherein the power management unit is configured to measure a state of charge (SOC) of each of the main power source and the secondary power source individually.

Example 18 includes the system of any of the preceding examples 1-17, wherein the power management unit is configured to independently regulate the electrical power charging process and/or the electrical power distribution by based on one or more factors, including: a SOC of each power source, an output power consumption of the main subsystems of the vehicle and/or the at least some of the autonomous control modules of the vehicle, an internal temperature of the autonomous vehicle, an engine speed and/or vehicle speed of the autonomous vehicle, or a current driving application of the autonomous vehicle including highway driving or surface street driving.

In some embodiments in accordance with the present technology (example A1), a system for power management in an autonomous vehicle having a main power source and one or more alternators includes a vehicle control unit comprising a processor and memory, the vehicle control unit configured to provide control signals to (i) main subsystems of an autonomous vehicle including a steering subsystem, a throttle subsystem and a braking subsystem and (ii) autonomous control modules of the autonomous vehicle including a steering control module, a throttle control module and a braking control module to autonomously drive the autonomous vehicle, wherein the main subsystems of the autonomous vehicle are supplied electrical power from the main power source of the autonomous vehicle; a secondary power source electrically connected to one or both of the main power source and the one or more alternators of the autonomous vehicle to obtain electrical power, the secondary power source in communication with the vehicle control unit to supply the electrical power to at least some of the autonomous control modules; and a power management unit comprising a processor and memory, the power management unit configured to (i) independently regulate an electrical power charging process of the main power source and the secondary power source and (ii) independently regulate electrical power distribution to the main subsystems of the autonomous vehicle and to the at least some of the autonomous control modules of the autonomous vehicle.

Example A2 includes the system of any of examples A1-A5, wherein the main power source is connected to a first alternator of the autonomous vehicle, and wherein the secondary power source is connected to the main power source of the autonomous vehicle.

Example A3 includes the system of any of examples A1-A5, wherein the main power source is connected to a first alternator of the autonomous vehicle, and wherein the secondary power source is connected to a second alternator of the autonomous vehicle.

Example A4 includes the system of any of examples A1-A5, wherein one or both of the main power source and the secondary power source includes a battery.

Example A5 includes the system of any of examples A1-A4, wherein the main power source and the secondary power source are different types of power sources.

In some embodiments in accordance with the present technology (example B1), a method for power management of an autonomous vehicle includes independently regulating, by a power management unit comprising a processor and a memory and resident in an autonomous vehicle, an electrical power charging process of a main power source of the autonomous vehicle and a secondary power source implemented on the autonomous vehicle; and independently regulating, by the power management unit, an electrical power distribution process to at least some of main subsystems of the autonomous vehicle and to the at least some of autonomous control modules of the autonomous vehicle, wherein the main subsystems of the autonomous vehicle include a steering subsystem, a throttle subsystem and a braking subsystem and wherein the autonomous control modules of the autonomous vehicle include a steering control module, a throttle control module and a braking control module to autonomously drive the vehicle.

Example B2 includes the method of any of examples B1-B5, wherein the independently regulating the electrical power charging process of the main power source and the secondary power source includes determining an operation of an alternator coupled to the secondary power source and opening a relay between the secondary power source and the main power source to allow charging of the secondary power source from the main power source.

Example B3 includes the method of any of examples B1-B5, wherein the independently regulating the electrical power charging process of the main power source and the secondary power source includes determining a state of charge (SOC) of the main power source is below a threshold and closing a relay between the secondary power source and the main power source to prevent over-discharging the main power source.

Example B4 includes the method of any of examples B1-B5, wherein the independently regulating the electrical power charging process of the main power source and the secondary power source includes determining that an outside power source is connected to one or both of the main power source and the secondary power source and opening a charging loop to allow the one or both of the main power source and the secondary power source to receive current.

Example B5 includes the method of any of examples B1-B4, comprising, independently regulating, by the power management unit, the electrical power charging process and/or the electrical power distribution process based on one or more factors, including: a state of charge (SOC) of each power source, an output power consumption of the main subsystems of the vehicle and/or the at least some of the autonomous control modules of the vehicle, an internal temperature of the autonomous vehicle, an engine speed and/or vehicle speed of the autonomous vehicle, or a current driving application of the autonomous vehicle including highway driving or surface street driving.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

It is intended that the specification, together with the drawings, be considered exemplary only, where exemplary means an example. As used herein, the singular forms "a", "an" and "the" are intended to include the plural forms as well, unless the context clearly indicates otherwise. Additionally, the use of "or" is intended to include "and/or", unless the context clearly indicates otherwise.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A system for power management in an autonomous vehicle having a main power source electrically connected to a first alternator coupled to a primary engine of the autonomous vehicle by a first belt, the system comprising:
   a vehicle control unit comprising a processor and memory, the vehicle control unit configured to provide control signals to (i) main subsystems of the autonomous vehicle including a steering subsystem, a throttle subsystem and a braking subsystem and (ii) autonomous control modules of the autonomous vehicle including a steering control module, a throttle control module and a braking control module to autonomously drive the autonomous vehicle, wherein the main subsystems of the autonomous vehicle are supplied electrical power from the main power source;
   a second alternator coupled to the primary engine of the autonomous vehicle by a second belt;
   a secondary power source electrically connected to the second alternator and to the vehicle control unit to supply electrical power to at least some of the autonomous control modules, wherein the second alternator is independent from the first alternator; and
   a power management unit comprising a processor and memory, the power management unit configured to (i) independently regulate an electrical power charging process of the main power source and the secondary power source and (ii) independently regulate electrical power distribution to the main subsystems of the autonomous vehicle and to the at least some of the autonomous control modules of the autonomous vehicle,
wherein the power management unit is configured to be updated in real time based on an evaluation of a current driving condition of the autonomous vehicle to optimize independent regulation of (i) the electrical power charging process of the main power source and the secondary power source and (ii) the electrical power distribution to the main subsystems and to the at least some of the autonomous control modules.

2. The system of claim 1, wherein one or both of the main power source and the secondary power source includes a battery.

3. The system of claim 1, wherein the power management unit is configured to measure a state of charge (SOC) of each of the main power source and the secondary power source individually.

4. The system of claim 1, wherein the power management unit is configured to independently regulate the electrical power charging process and/or the electrical power distribution based on:
a state of charge (SOC) of each power source.

5. The system of claim 1, wherein the power management unit is configured to independently regulate the electrical power charging process and/or the electrical power distribution based on:
an output power consumption of the main subsystems of the autonomous vehicle and/or the at least some of the autonomous control modules of the autonomous vehicle.

6. The system of claim 1, wherein the power management unit is configured to independently regulate the electrical power charging process and/or the electrical power distribution based on:
an internal temperature of the autonomous vehicle, an engine speed and/or vehicle speed of the autonomous vehicle.

7. The system of claim 1, wherein the power management unit is configured to independently regulate the electrical power charging process and/or the electrical power distribution based on:
a current driving application of the autonomous vehicle including highway driving or surface street driving.

8. The system of claim 1, wherein the main power source and the secondary power source are different types of power sources.

9. The system of claim 1, wherein the processor and memory of the power management unit includes the processor and memory of the vehicle control unit.

10. A method for power management of an autonomous vehicle, the method comprising:
independently regulating, by a power management unit comprising a processor and a memory and resident in an autonomous vehicle, an electrical power charging process of a main power source of the autonomous vehicle and a secondary power source implemented on the autonomous vehicle, wherein the main power source is electrically connected to a first alternator coupled to a primary engine of the autonomous vehicle, and the secondary power source is electrically connected to a second alternator coupled to the primary engine of the autonomous vehicle, wherein the second alternator is independent from the first alternator, and wherein the first alternator is coupled to the primary engine by a first belt, and the second alternator is coupled to the primary engine by a second belt;

independently regulating, by the power management unit, an electrical power distribution process to at least some of main subsystems of the autonomous vehicle and to the at least some of autonomous control modules of the autonomous vehicle,
wherein the main subsystems of the autonomous vehicle include a steering subsystem, a throttle subsystem and a braking subsystem and wherein the autonomous control modules of the autonomous vehicle include a steering control module, a throttle control module and a braking control module to autonomously drive the autonomous vehicle, and
updating a software-based control of the power management unit, in real time, based on an evaluation of a current driving condition of the autonomous vehicle to optimize independent regulation of (i) the electrical power charging process of the main power source and the secondary power source and (ii) the electrical power distribution to the main subsystems and to the at least some of the autonomous control modules.

11. The method of claim 10, wherein the independently regulating the electrical power charging process of the main power source and the secondary power source includes determining an operation of the second alternator electrically connected to the secondary power source and opening a relay between the secondary power source and the main power source to allow charging of the secondary power source from the main power source.

12. The method of claim 10, wherein the independently regulating the electrical power charging process of the main power source and the secondary power source includes determining a state of charge (SOC) of the main power source is below a threshold and closing a relay between the secondary power source and the main power source to prevent over-discharging the main power source.

13. The method of claim 10, wherein the independently regulating the electrical power charging process of the main power source and the secondary power source includes determining that an outside power source is connected to one or both of the main power source and the secondary power source and opening a charging loop to allow the one or both of the main power source and the secondary power source to receive current.

14. The method of claim 10, comprising, independently regulating, by the power management unit, the electrical power charging process and/or the electrical power distribution process based on one or more factors, including:
a state of charge (SOC) of each power source,
an output power consumption of the main subsystems of the autonomous vehicle and/or the at least some of the autonomous control modules of the autonomous vehicle,
an internal temperature of the autonomous vehicle, an engine speed and/or vehicle speed of the autonomous vehicle, or
a current driving application of the autonomous vehicle including highway driving or surface street driving.

15. The method of claim 10, further comprising:
evaluating an autonomous driving application of the autonomous vehicle to update the power management unit by optimizing an independent control of power distribution of one or both of the main power source and the secondary power source based on a current driving situation of the autonomous vehicle.

16. The method of claim 15, wherein the optimizing the independent control of the power distribution is operated in communication with an online server or computer.

17. The method of claim 15, wherein the optimizing the independent control of the power distribution includes using a set of driving conditions data that describes autonomous driving operations in response to a known scenario.

18. The method of claim 15, wherein the optimizing the independent control of the power distribution includes using a set of status conditions data that describes one or more aspects of the autonomous vehicle include a speed, a brake amount, or a transmission gear during autonomous driving operations in response to a known scenario.

19. A method for power management of an autonomous vehicle, the method comprising:
   independently regulating, by a power management unit comprising a processor and a memory and resident in an autonomous vehicle, an electrical power charging process of a main power source of the autonomous vehicle and a secondary power source implemented on the autonomous vehicle, wherein the main power source is electrically connected to a first alternator coupled to a primary engine of the autonomous vehicle, and the secondary power source is electrically connected to a second alternator coupled to the primary engine of the autonomous vehicle, wherein the second alternator is independent from the first alternator, and wherein the first alternator is coupled to the primary engine by a first belt, and the second alternator is coupled to the primary engine by a second belt;
   independently regulating, by the power management unit, an electrical power distribution process to at least some of main subsystems of the autonomous vehicle and to the at least some of autonomous control modules of the autonomous vehicle,
   wherein the main subsystems of the autonomous vehicle include a steering subsystem, a throttle subsystem and a braking subsystem and wherein the autonomous control modules of the autonomous vehicle include a steering control module, a throttle control module and a braking control module to autonomously drive the autonomous vehicle; and
   evaluating an autonomous driving application of the autonomous vehicle to update the power management unit by optimizing an independent control of power distribution of one or both of the main power source and the secondary power source based on a current driving situation of the autonomous vehicle.

20. The method of claim 19, wherein the optimizing the independent control of the power distribution includes at least one of:
   optimizing the independent control of the power distribution in communication with an online server or computer;
   using a set of driving conditions data that describes autonomous driving operations in response to a known scenario; or
   using a set of status conditions data that describes one or more aspects of the autonomous vehicle include a speed, a brake amount, or a transmission gear during autonomous driving operations in response to a known scenario.

* * * * *